United States Patent
Kozik et al.

(10) Patent No.: US 6,874,528 B2
(45) Date of Patent: Apr. 5, 2005

(54) FILL VALVE ASSEMBLY

(75) Inventors: Meir Kozik, Moshav Bnei Zion (IL); Mordechai Avnon, Kibbutz Mashabe Sade (IL)

(73) Assignee: K.C. Technologies Ltd., Ramat Gan (IL)

( * ) Notice: Subject to any disclaimer, the term of this patent is extended or adjusted under 35 U.S.C. 154(b) by 0 days.

(21) Appl. No.: 10/222,511

(22) Filed: Aug. 16, 2002

(65) Prior Publication Data

US 2004/0031522 A1 Feb. 19, 2004

(51) Int. Cl.⁷ .......................... F16K 31/20; F16K 31/26; F16K 33/00
(52) U.S. Cl. .................... 137/442; 73/322.5; 137/436; 137/446; 141/198
(58) Field of Search ............................... 137/436, 434, 137/442, 448, 444, 446, 401, 408, 427; 73/305, 317, 322.5; 141/198; 222/64, 67

(56) References Cited

U.S. PATENT DOCUMENTS

| | | | | |
|---|---|---|---|---|
| 164,539 A | * | 6/1875 | Fuller ........................ | 137/442 |
| 178,656 A | * | 6/1876 | Meyer ........................ | 137/442 |
| 436,177 A | * | 9/1890 | Holmes ....................... | 137/434 |
| 581,538 A | * | 4/1897 | Dean .......................... | 137/401 |
| 582,911 A | | 5/1897 | Frederick | |
| 767,848 A | * | 8/1904 | Stillman ..................... | 137/443 |
| 953,235 A | * | 3/1910 | Rymer ........................ | 137/411 |
| 1,266,637 A | | 5/1918 | Snyder | |
| 1,526,738 A | * | 2/1925 | Brady ........................ | 137/442 |
| 1,983,061 A | | 12/1934 | Ambroz et al. ............. | 137/104 |
| 2,182,415 A | | 12/1939 | Thigpen | |
| 2,269,127 A | * | 1/1942 | Riley ......................... | 137/442 |
| 2,504,638 A | | 4/1950 | Browning ................... | 137/104 |
| 2,550,313 A | | 4/1951 | Tucker ....................... | 137/104 |
| 3,324,878 A | | 6/1967 | Dill ............................ | 137/418 |
| 3,428,078 A | * | 2/1969 | Christopher ................ | 137/427 |
| 3,756,269 A | | 9/1973 | Brown ........................ | 137/446 |
| 4,064,907 A | | 12/1977 | Billington et al. ......... | 137/614.2 |
| 4,142,552 A | * | 3/1979 | Brown et al. ............... | 137/446 |
| 4,177,829 A | | 12/1979 | Friedman .................... | 137/426 |
| 4,483,367 A | | 11/1984 | Ross, Jr. et al. ........... | 137/416 |
| 4,541,464 A | * | 9/1985 | Christiansen ............... | 137/446 |
| 4,601,071 A | * | 7/1986 | Persson ...................... | 137/410 |
| 5,072,751 A | | 12/1991 | Lin ............................. | 137/429 |
| 5,522,415 A | * | 6/1996 | Hopenfeld .................. | 137/426 |
| 5,660,214 A | * | 8/1997 | Pettesch ..................... | 141/198 |
| 6,003,541 A | | 12/1999 | Nichols-Roy | |
| 6,026,841 A | | 2/2000 | Kozik ........................ | 137/202 |
| 6,076,546 A | * | 6/2000 | Waters ....................... | 137/446 |
| 6,227,233 B1 | | 5/2001 | Kozik ........................ | 137/315.08 |
| 6,293,302 B1 | * | 9/2001 | Waters et al. .............. | 137/446 |
| 6,308,729 B2 | | 10/2001 | Kozik ........................ | 137/446 |
| 6,536,465 B2 | * | 3/2003 | David et al. ................ | 137/442 |

FOREIGN PATENT DOCUMENTS

| | | |
|---|---|---|
| CA | 2204460 | 11/1998 |
| DE | 78 432 | 11/1894 |
| DE | 11 42 736 | 1/1963 |
| EP | 1 070 908 | 1/2001 |
| FR | 901 265 | 7/1945 |
| GB | 613 813 | 12/1948 |
| GB | 2 062 811 | 5/1981 |

* cited by examiner

*Primary Examiner*—George L. Walton
(74) *Attorney, Agent, or Firm*—Mark M. Friedman

(57) ABSTRACT

A fill valve assembly comprises a valve body extending along a longitudinal axis and defining a fluid inlet, a valve seat and at least one fluid outlet, an axially slidable valve element arranged for axially slidable movement along the longitudinal axis, into and out of sealing engagement with the valve seat, the axially slidable valve element defining a first upstream conical surface having a first surface area and a second downstream conical surface having a second surface area, greater than the first surface area, and a fill sensor operative below a predetermined fill threshold to prevent the axially slidable valve element from establishing sealing engagement with the valve seat.

18 Claims, 16 Drawing Sheets

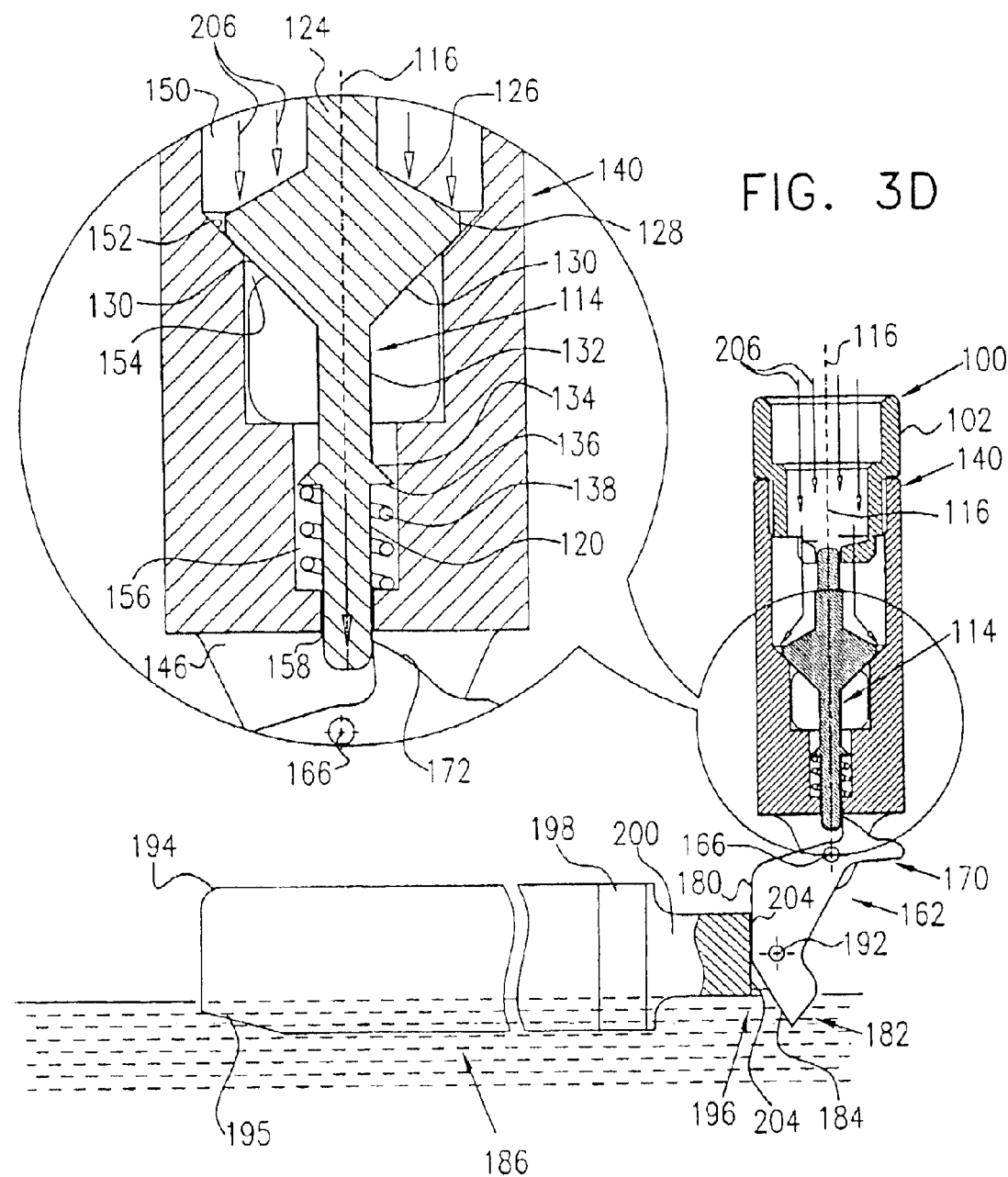

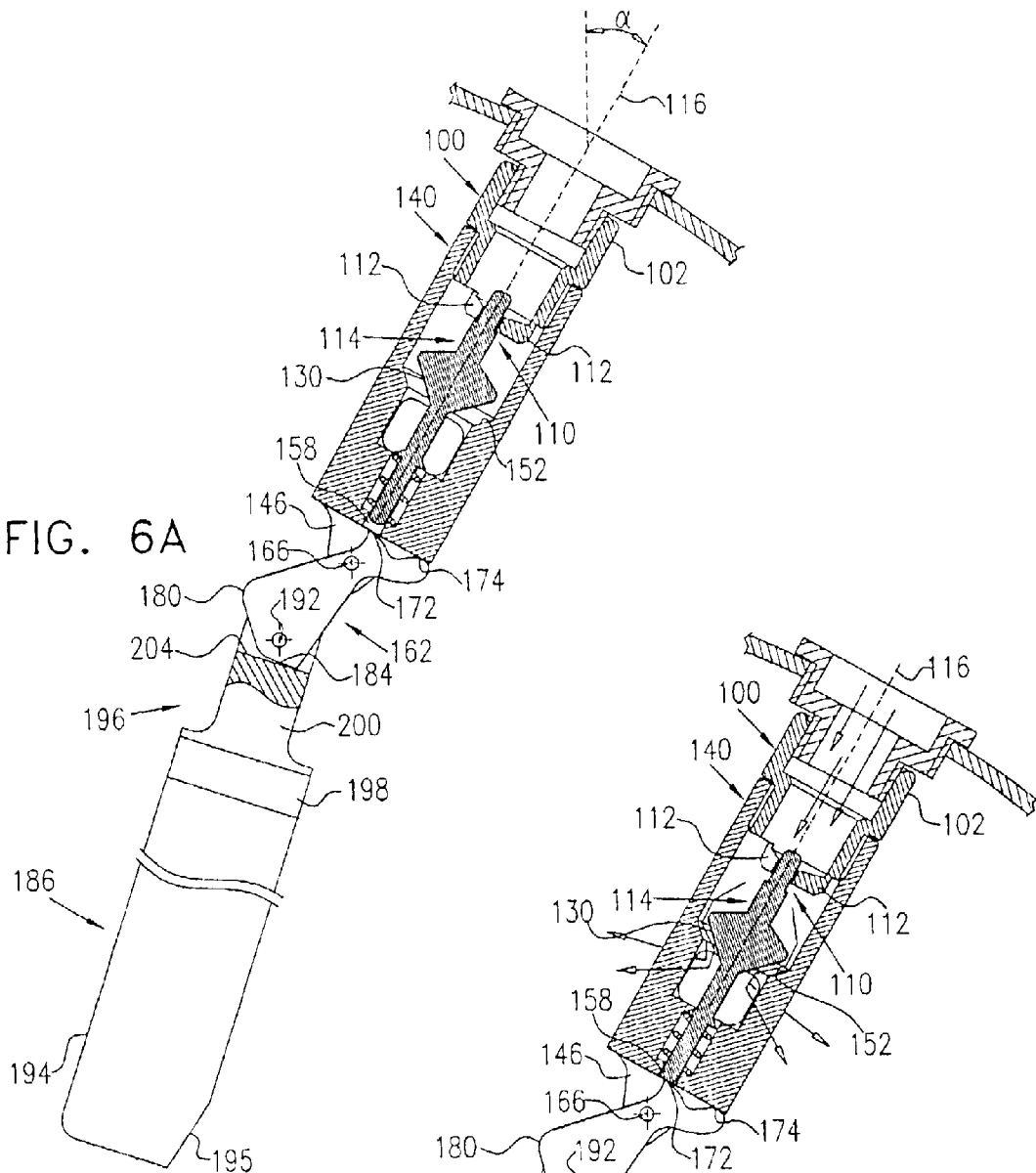
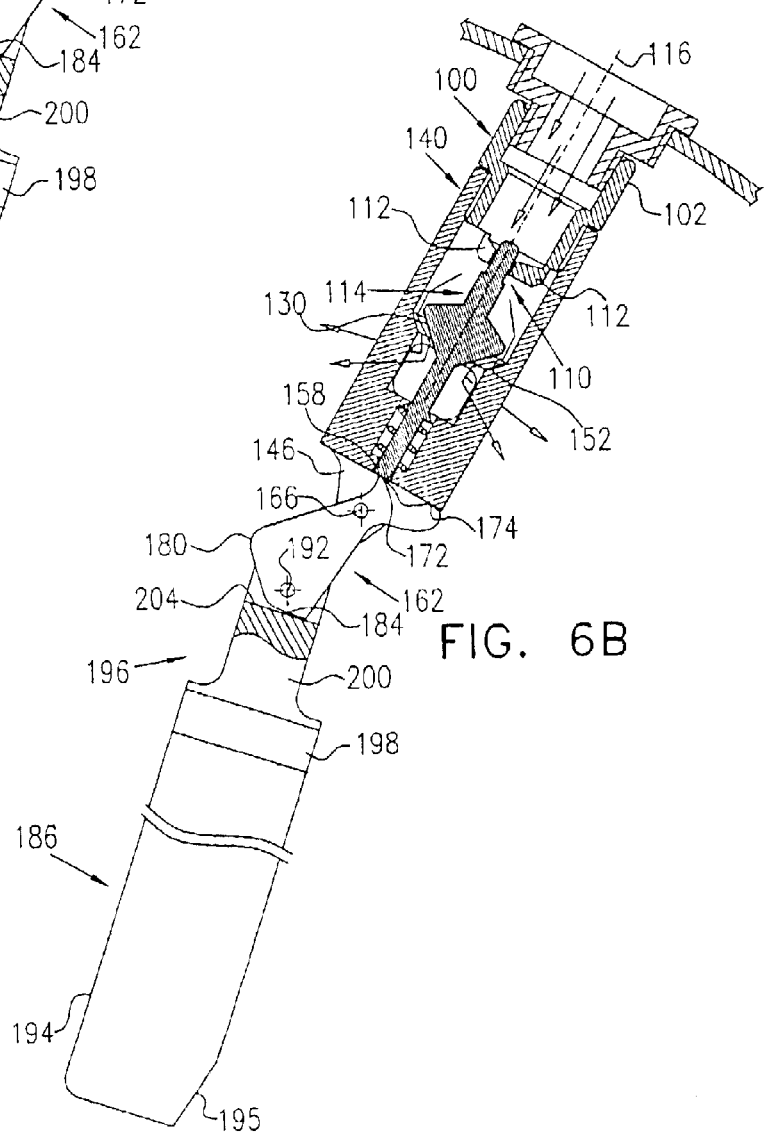
FIG. 6A
FIG. 6B

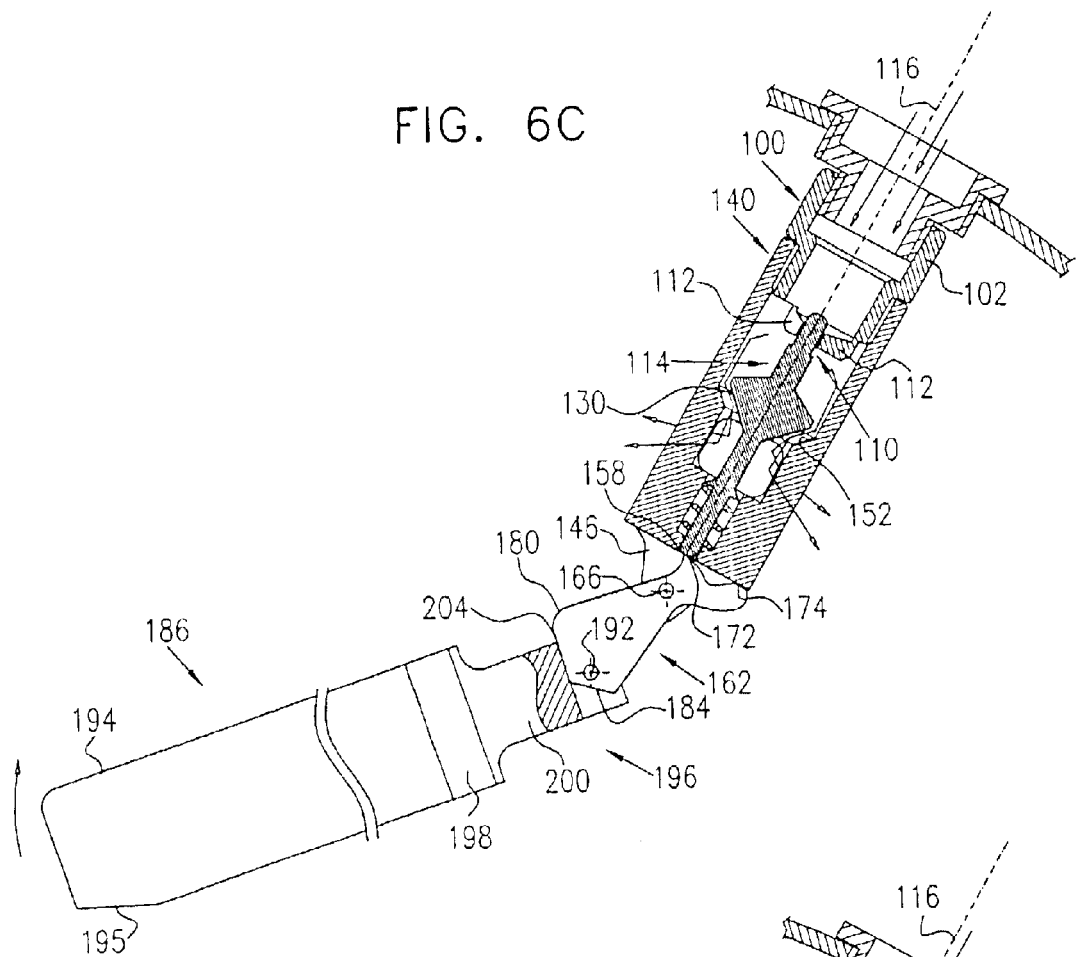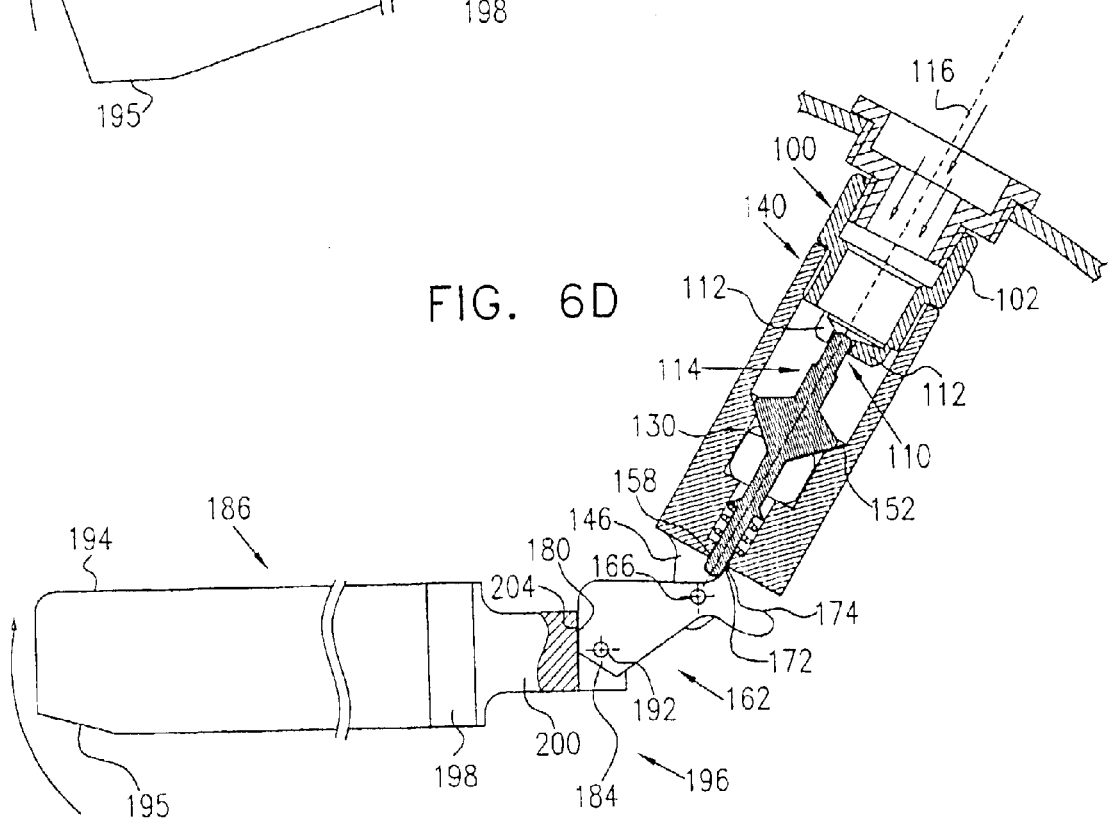

FILL VALVE ASSEMBLY

FIELD OF THE INVENTION

The present invention relates to fill valve assemblies generally

BACKGROUND OF THE INVENTION

The following U.S. Patents, which include patents of the present applicant, are believed to represent the current state of the art U.S. Pat. Nos. 582,911, 1,266,637, 1,983,0612, 2,504,638, 2,550,313, 3,324,878; 3,756,269, 4,064,907, 4,177,829, 4,483,367, 4,541,464, 5,072,751; 6,026,841, 6,227,233 and 6,308,729

SUMMARY OF THE INVENTION

The present invention seeks to provide an improved fill valve assembly

There is thus provided in accordance with a preferred embodiment of the present invention a fill valve assembly including a valve body extending along a longitudinal axis and defining a fluid inlet, a valve seat and at least one fluid outlet, an axially slidable valve element arranged for axially slidable movement along the longitudinal axis, into and out of sealing engagement with the valve seat, the axially slidable valve element defining a first upstream conical surface having a first surface area and a second downstream conical surface having a second surface area, greater than the first surface area, and a fill sensor operative below a predetermined fill threshold to prevent the axially slidable valve element from establishing sealing engagement with the valve seat. Preferably, the at least one fluid outlet comprises a pair of oppositely directed fluid outlets arranged to direct fluid at an angle of preferably 45 degrees below the horizontal axis.

There is also provided in accordance with a preferred embodiment of the present invention, a fill valve assembly including a valve body extending along a longitudinal axis and defining a fluid inlet, a valve seat and a pair of oppositely directed fluid outlets arranged to direct fluid at an angle of preferably 45 degrees below the horizontal axis, an axially slidable valve element arranged for axially slidable movement along the longitudinal axis, into and out of sealing engagement with the valve seat, and a fill sensor operative below a predetermined fill threshold to prevent the axially slidable valve element from establishing sealing engagement with the valve seat Preferably, the axially slidable valve element is arranged for axially slidable movement along the longitudinal axis, along first and second guides, into and out of sealing engagement with the valve seat There is further provided in accordance with a preferred embodiment of the present invention, a fill valve assembly including a valve body extending along a longitudinal axis and defining a fluid inlet, a valve seat and at least one fluid outlet, an axially slidable valve element arranged for axially slidable movement along the longitudinal axis, along first and second guides, into and out of sealing engagement with the valve seat, and a fill sensor operative below a predetermined fill threshold to prevent the axially slidable valve element from establishing sealing engagement with the valve seat Preferably, the at least one fluid outlet comprises a pair of oppositely directed fluid outlets arranged to direct fluid at an angle of preferably 45 degrees below the horizontal axis Preferably, the first guide comprises a plurality of guide fingers disposed above the valve seat Additionally, the second guide comprises a guide bore defined by the valve body below the valve seat.

In accordance with another preferred embodiment, the fill sensor comprises a float assembly operative within a predetermined range of float orientations relative to the longitudinal axis to prevent the axially slidable valve element from establishing sealing engagement with the valve seat. Preferably, the float assembly includes a hollow float element having an opening arranged at a bottom, outwardly extending location thereon

BRIEF DESCRIPTION OF THE DRAWINGS

The present invention will be understood and appreciated more fully from the following detailed description, taken in conjunction with the drawings in which FIGS. 3A, 3B, 3C, 3D and 3E are simplified partially sectional, partially pictorial illustrations of the fill valve assembly of FIG. 1 in five different operative orientations, FIGS. 6A, 6B, 6C, 6D and 6E are simplified pictorial illustrations of the fill valve assembly of FIG. 1 in five different operative orientations during filling at an angle

DETAILED DESCRIPTION OF PREFERRED EMBODIMENTS

Figure 1:
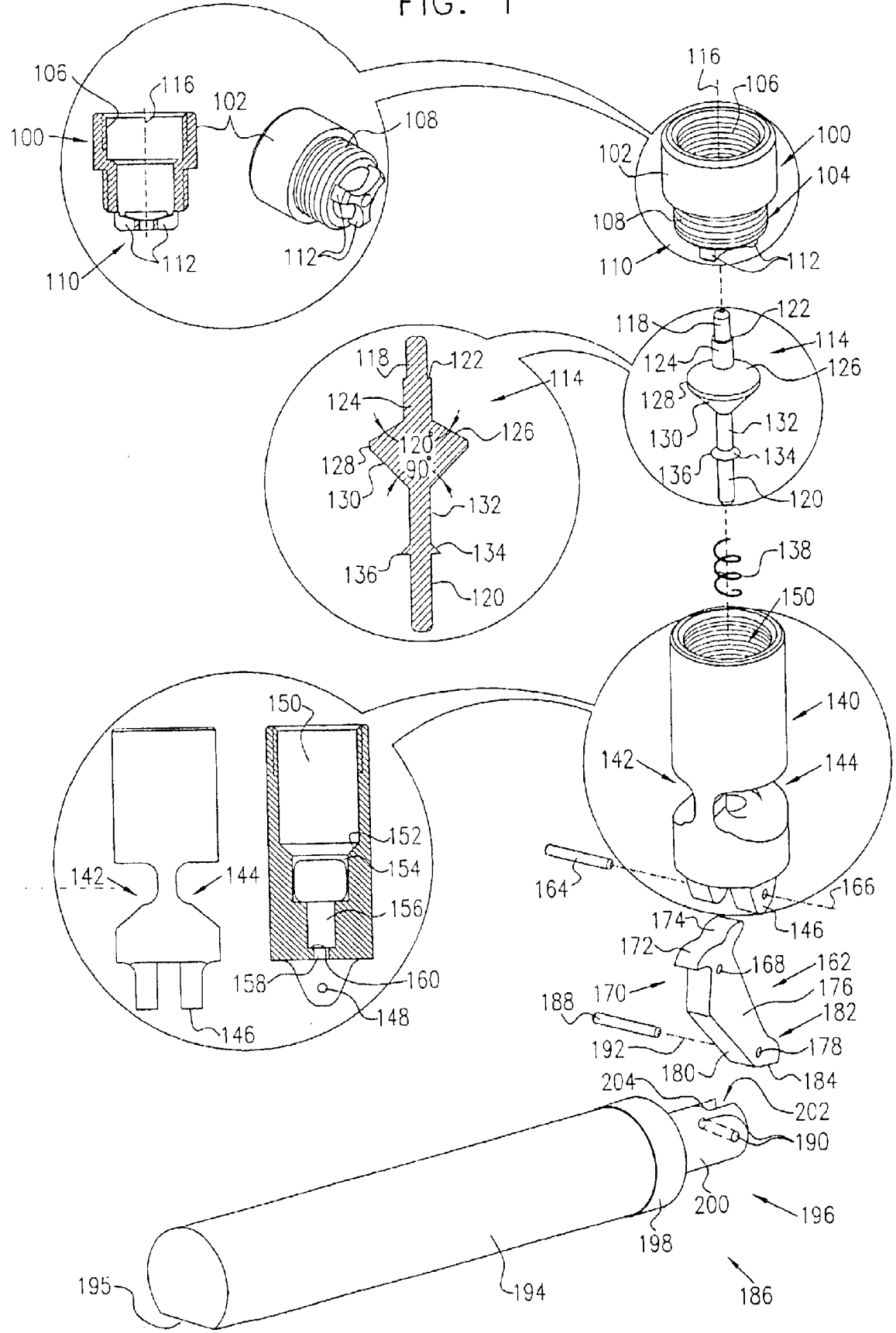
FIG. 1 is a simplified exploded view and sectional illustration of a fill valve assembly constructed and operative in accordance with a preferred embodiment of the present invention.

Reference is now made to FIG. 1, which is a simplified exploded view and sectional illustration of a fill valve assembly constructed and operative in accordance with a preferred embodiment of the present invention As seen in FIG. 1, there is provided in accordance with a preferred embodiment of the present invention a fill valve assembly preferably comprising an internally threaded coupler 100 which is adapted for connection to a fill pipe (not shown) Coupler 100, as shown in FIG. 1, preferably includes a first generally cylindrical portion 102 having a relatively large inner and outer diameter, which is integrally formed with a second generally cylindrical portion 104, having inner and outer diameters which are small than those of portion 102

Cylindrical portion 102 preferably is formed with threading along its inner surface 106, while cylindrical portion 104 preferably is formed with threading alone its outer surface 108 Depending from cylindrical portion 104 and integrally formed therewith there is preferably formed a guide 110, preferably formed by a plurality of guide fingers 112 which extend inwardly with respect to cylindrical portion 104, thereby to define a guide for axial motion of an axially slidable valve element 114 along an axis 116

Axially slidable valve element 114 is preferably a rotationally symmetric integrally formed element and preferably includes top and bottom shaft portions 118 and 120, the top shaft portion 118 being arranged for slidable motion relative to guide 110 Disposed below top shaft portion 118 and separated therefrom by a shoulder 122 is a first intermediate shaft portion 124 having an outer diameter slightly greater than that of top shaft portion 118.

Intermediate shaft portion 124 terminates in a first generally conical portion 126, which preferably defines a 120 degree truncated cone. Disposed below conical portion 126 is a relatively narrow circularly cylindrical band 128 from which depends a second generally conical portion 130, which preferably defines a 90 degree truncated cone and terminates in a second intermediate shaft portion 132.

Intermediate shaft portion 132 preferably terminates in a spring seat 134, which is typically of truncated conical configuration and defines a generally flat spring seat surface 136 from which extends the bottom shaft portion 120

A compression spring 138 is arranged to be disposed about bottom shaft portion 120

A valve body 140 is arranged for threaded attachment to coupler 100. The valve body preferably is of generally circularly cylindrical configuration and has first and second generally oppositely facing outlet apertures 142 and 144 formed therein Integrally formed with the valve body and depending therefrom are a pair of mutually aligned mounting lugs 146, preferably formed with coaxial apertures 148

The interior of valve body 140 preferably includes a central bore 150, which is preferably formed with internal threading at the top thereof for threaded engagement with corresponding threading on the outer surface 108 of coupler 100 Central bore 150 preferably leads to a generally conical valve seat portion 152, which matches the conical configuration of second truncated conical surface 130 of slidable valve element 114 and thus defines an angle of 90 degrees.

Below valve seat portion 152 is an intermediate bore 154, having a diameter which is less than that of central bore 150 and communicating with outlet apertures 142 and 144 Disposed below intermediate bore 154 is a spring seat defining bore 156, having an diameter which is less than that of intermediate bore 154 Disposed below spring seat defining bore 156 is a guide bore 158 which serves as a guide for bottom shaft portion 120 of slidable valve element 114 and has a diameter which is less than that of spring seat defining bore 156 A shoulder 160 defined by the intersection of bores 154 and 156 defines a spring seat for spring 138

A cam 162 is pivotably attached to valve body 140 by means of a pin 164 which extends along a pivot axis 166 through coaxial apertures 148 of mutually aligned mounting lugs 146 and through a first aperture 168 formed in cam 162.

Cam 162 is preferably an integrally formed element comprising an asymmetrical upper portion 170 lying above aperture 168 and including a bottom shaft engagement surface 172 and a valve body engagement surface 174 adjacent to bottom shaft engagement surface 172 and spaced therefrom Integrally formed with upper portion 170 is an intermediate portion 176 extending generally from aperture 168 down to a second aperture 178 and defining a first float engagement surface 180 Integrally formed with intermediate portion 176 is a bottom portion 182, extending downwardly from aperture 178 and defining a second float engagement surface 184

A float assembly 186 is pivotably mounted onto cam 162 by means of a pin 188 extending through aperture 178 and through coaxial apertures 190 formed in float assembly 186 along a pivot axis 192 Float assembly 186 preferably comprises a generally hollow cylindrical portion 194, having an opening 195 at a bottom outwardly extending location thereon Cylindrical portion 194 is rigidly coupled to a float coupling element 196, which is pivotably mounted via apertures 190 formed therein to cam 162.

The float coupling element 196 preferably includes a first generally cylindrical portion 198, which is sealed to cylindrical portion 194 Integrally formed with first cylindrical portion 198 is a second cylindrical portion 200 of smaller diameter that first cylindrical portion 198 and having formed therein a slit 202 which defines a bifurcated mounting including apertures 190 and a cam engagement surface 204

Figures 2A, 2B, 2C:
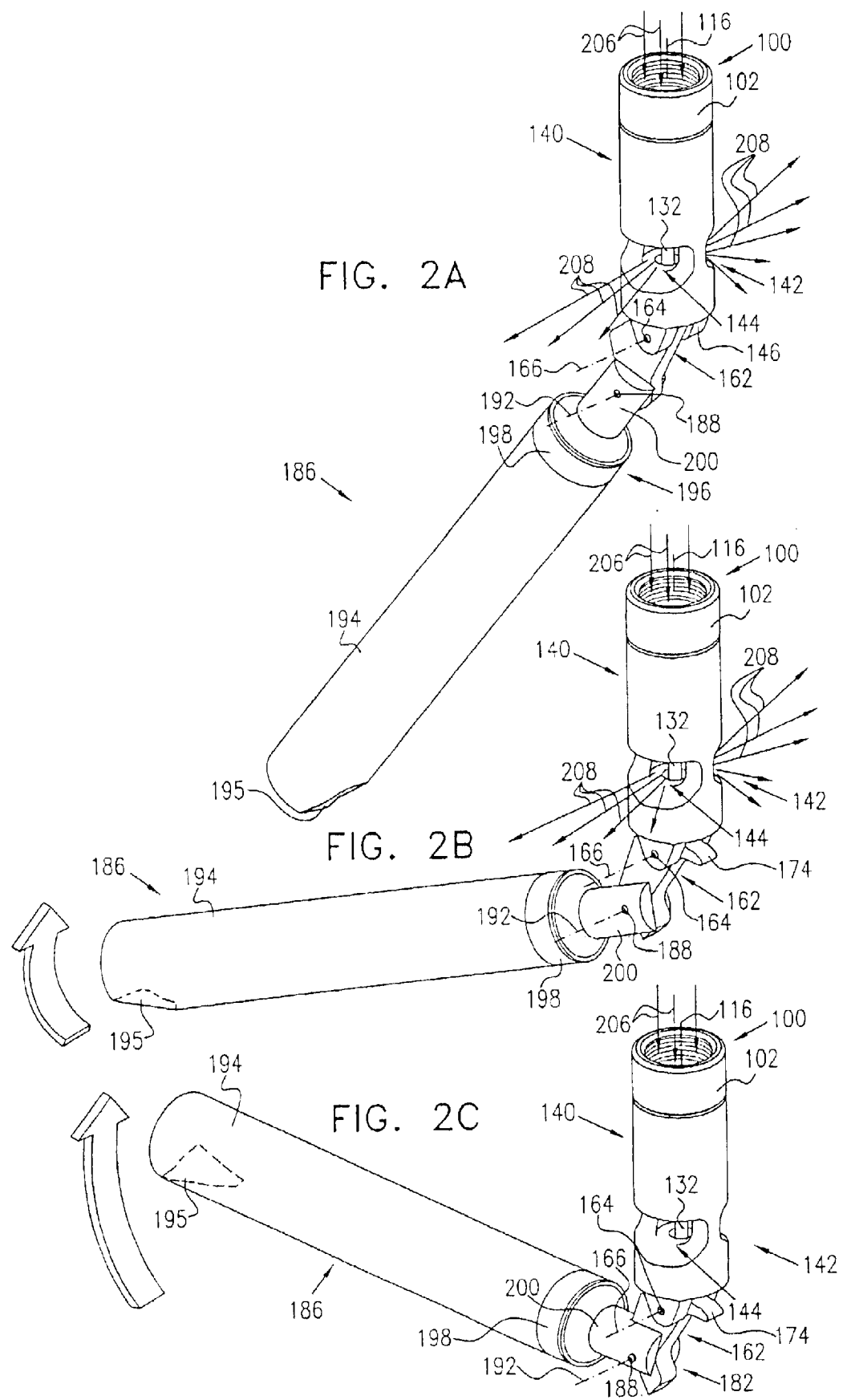
FIGS. 2A, 2B and 2C are simplified pictorial illustrations of the fill valve assembly of FIG. 1 in three different operative orientations.

Reference is now made to FIGS. 2A, 2B and 2C, which are simplified pictorial illustrations of the fill valve assembly of FIG. 1 in three different operative orientations FIG. 2A shows an initial fill operative orientation, wherein float assembly 186 is in its most downward facing orientation and hollow cylindrical portion 194 is filled with air When float assembly 186 is in the orientation shown in FIG. 2A, fluid supplied under pressure to valve body 140, as indicated by arrows 206 is allowed to exit the valve body through oppositely facing outlet apertures 142 and 144 formed therein, as indicated by arrows 208

FIG. 2B illustrates an intermediate operative orientation wherein the float assembly 186 is partially raised by the level of liquid (not shown) lying therebelow The orientation of opening 195 in cylindrical portion 194 ensures that the cylindrical portion remains generally filled with air. It is seen that also when float assembly 186 is in the intermediate orientation shown in FIG. 2B, fluid supplied under pressure to valve body 140, as indicated by arrows 206 is allowed to exit the valve body through oppositely facing outlet apertures 142 and 144 formed therein, as indicated by arrows 208

Figure 3A:
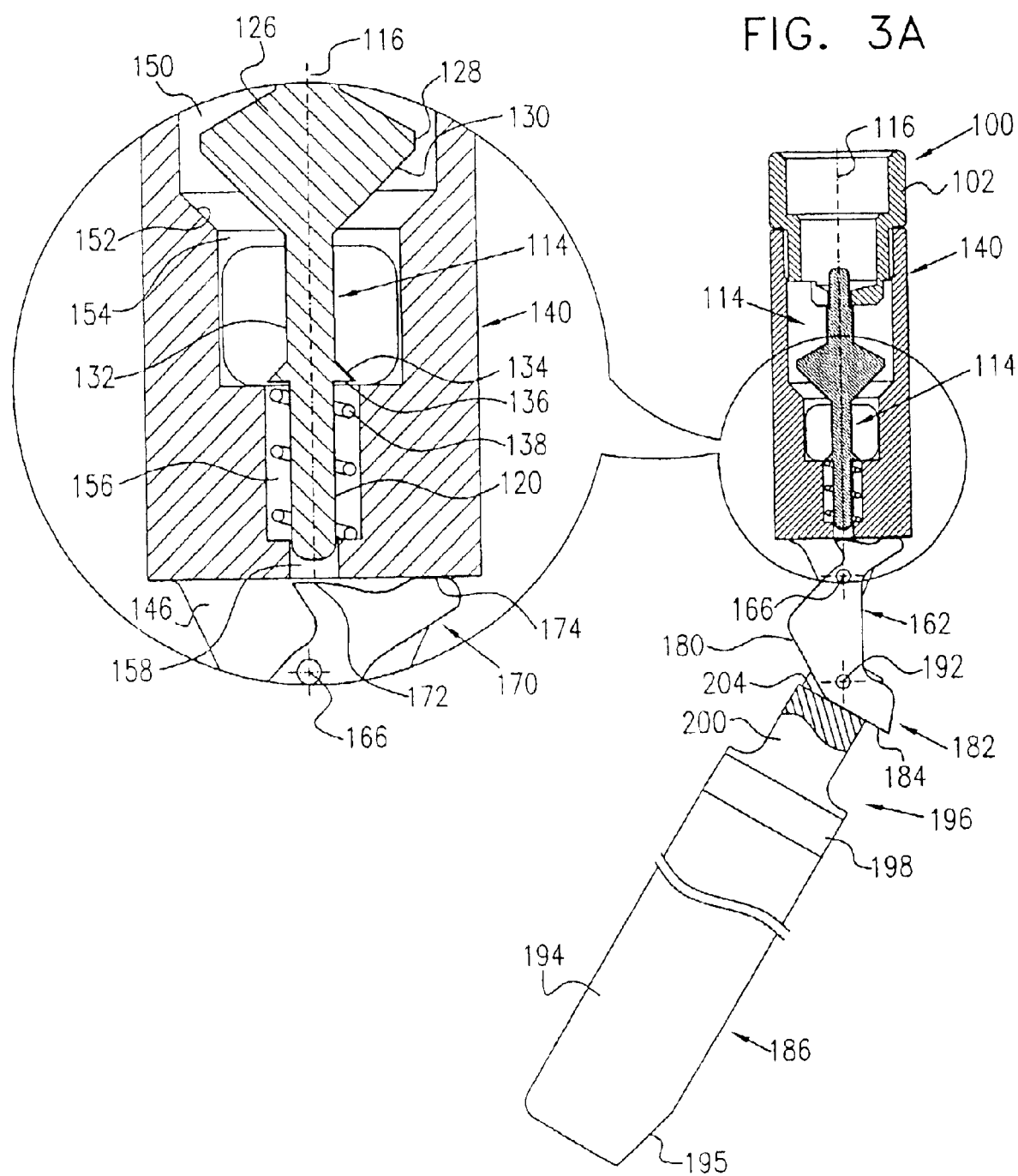

FIG. 2C illustrates a full raised operative orientation wherein the float assembly 186 is fully raised by the level of liquid (not shown) lying therebelow The orientation of opening 195 in cylindrical portion 194 ensures that the cylindrical portion remains generally filled with air It is seen that also when float assembly 186 is in the fully raised orientation shown in FIG. 2C, fluid supplied under pressure to valve body 140, as indicated by arrows 206 is not allowed to exit the valve body through oppositely, outlet apertures 142 and 144 formed therein Reference is now made to FIGS. 3A, 3B, 3C, 3D and 3E, which are simplified partially sectional, partially pictorial illustrations of the fill valve assembly of FIG. 1 in five different operative orientations FIG. 3A shows an orientation of the fill valve assembly of FIG. 1 wherein the float assembly 186 is in its most downward facing orientation, with cam engagement surface 204 of float coupling element 196 being in engagement with second float engagement surface 184 of cam 162, and hollow cylindrical portion 194 is filled with air, as shown in FIG. 2A. In this orientation the valve body engagement surface 174 of cam 162 engages a bottom surface of valve body 140, thus limiting the downward facing movement of the float assembly 186. However in the orientation of FIG. 3A no fluid is supplied under pressure to valve body 140

In the operative orientation of FIG. 3A, and in the absence of downward fluid pressure, compression spring 138 raises axially slidable valve element 114 along axis 116 so that second conical surface 130 is spaced from valve seat 152 of valve body 140

Figure 3B:
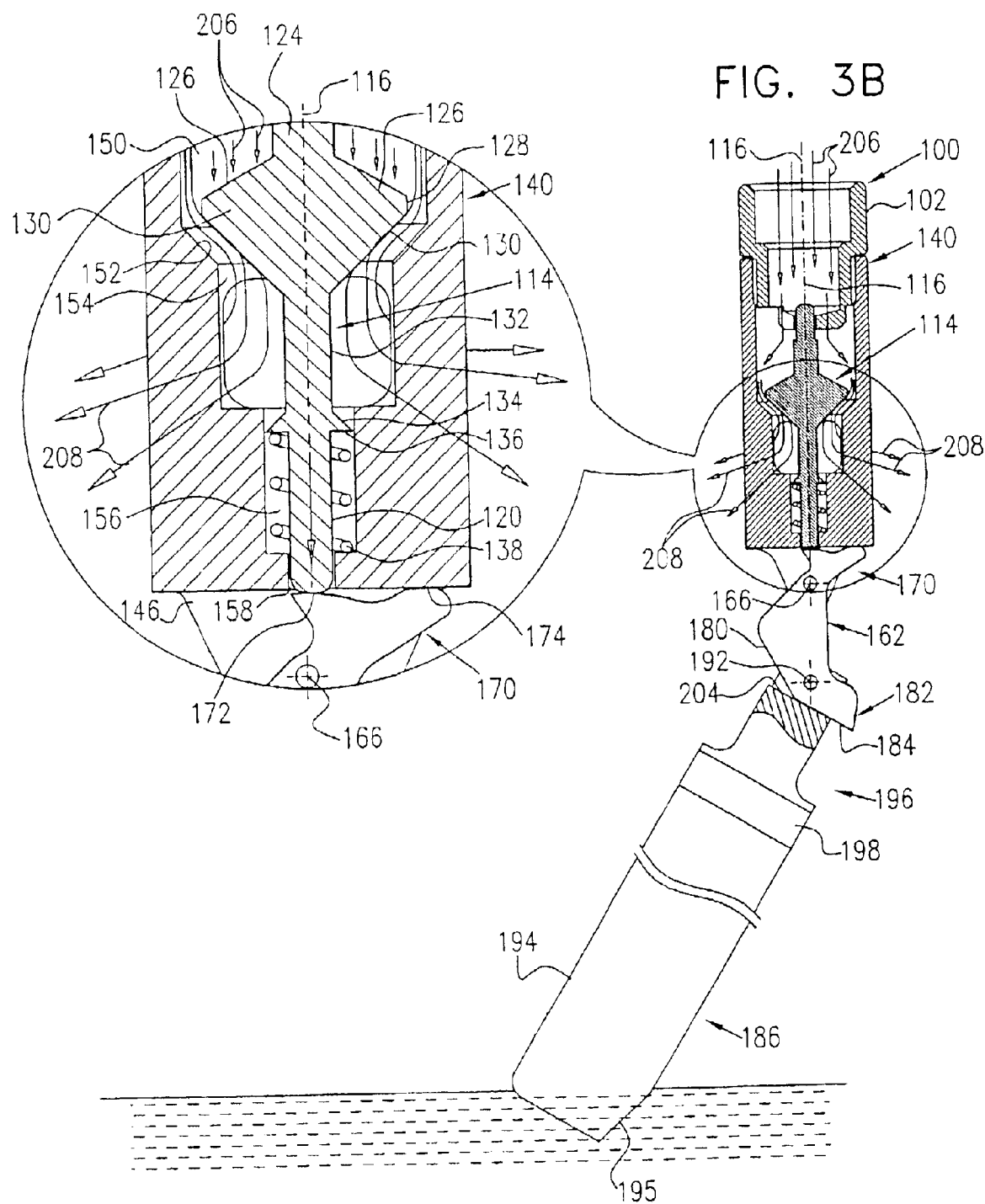
Figure 3C:
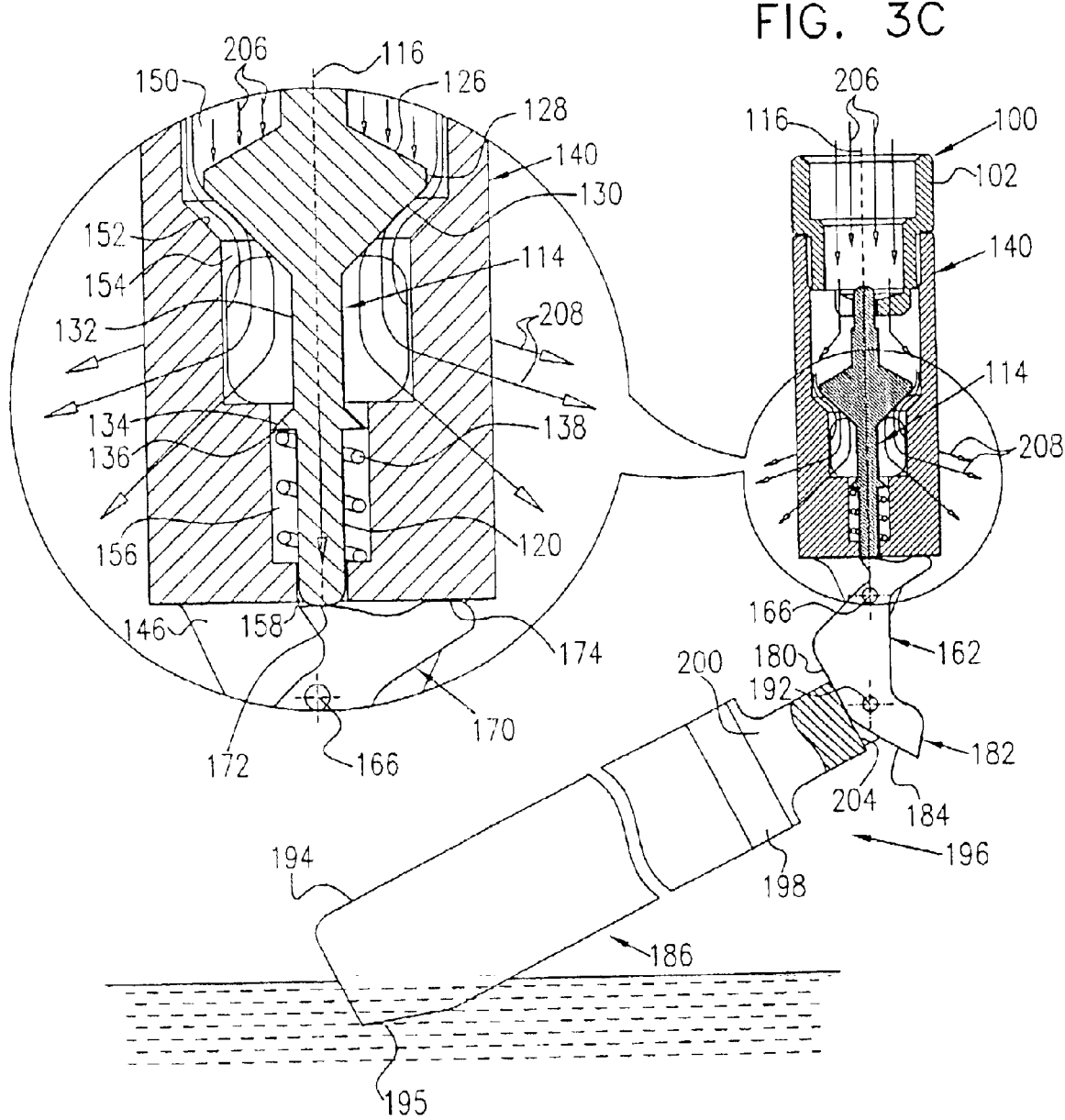

FIG. 3B similarly to FIG. 2A, also shows the float assembly 186 is in its most downward facing orientation and hollow cylindrical portion 194 filled with air Here fluid is supplied under pressure to the fill valve assembly as indicated by arrows 206 and is allowed to exit the valve body through oppositely facing outlet apertures 142 and 144 formed therein, as indicated by arrows 208 It is a particular feature of the present invention that the ratio of surface areas of first and second conical portions 126 and 130 respectively is such that the surface area of the underlying conical surface 130 of slidable valve element 114 exceeds that of the upward facing conical surface 126 thereof This relationship causes a certain amount of lift of the slidable valve element 114 to result from passage of fluid along underlying conical surface 130 and thus limits or decreases the net axial downward force along axis 116 exerted by the pressurized fluid on valve element 114 The reduction in this force has positive implications on the efficiency of the fill valve assembly FIG. 3C shows the float assembly 186 in the intermediate operative orientation shown also in FIG. 2B wherein the float assembly 186 is partially raised by the level of liquid (not shown in FIG. 2B) lying therebelow The orientation of opening 195 in cylindrical portion 194 ensures that the cylindrical portion remains generally filled with air It is seen that cam engagement surface 204 of float coupling element 196 lies in engagement with first float engagement surface 180 of cam 162 It is appreciated that further clockwise rotation of the float assembly 186 about pivot axis 192 produces clockwise rotation of cam 162 about pivot axis 166

It is seen that also when float assembly 186 is in the intermediate orientation shown in FIG. 3C, fluid supplied under pressure to valve body 140, as indicated by arrows 206 is allowed to exit the valve body through oppositely facing outlet apertures 142 and 144 formed therein, as indicated by arrows 208. This fluid flow is maintained by the engagement of bottom shaft engagement surface 172 of cam 162 with the bottom shaft portion 120 of slidable valve element 114, thus preventing downward axial motion of slidable valve element 114 along axis 116, notwithstanding the net axial downward force along axis 116 exerted by the pressurized fluid on valve element 114

FIG. 3D shows the float assembly 186 in the fully raised operative orientation shown also in FIG. 2C wherein the float assembly 186 is fully raised by the level of liquid (not shown in FIG. 2C) lying therebelow The orientation of opening 195 in cylindrical potion 194 ensures that the cylindrical portion remains generally filled with air It is seen that the further clockwise rotation of the float assembly 186, while cam engagement surface 204 of float coupling element 196 lies in engagement with first float engagement surface 180 of cam 162 produced clockwise rotation of cam 162 about pivot axis 166

It is seen that this rotation causes bottom shaft engagement surface 172 of cam 162 to rotate out of engagement with the bottom shaft portion 120 of slidable valve element 114, thus allowing downward axial motion of slidable valve element 114 along axis 116 in response to the net axial downward force along axis 116 exerted by the pressurized fluid on valve element 114 This downward displacement of slidable valve element 114 along axis 116 causes sealing engagement between conical surface 130 of the slidable valve element 114 and the valve seat 152 of valve body 140, thus preventing exit of fluid supplied under pressure to the fill valve assembly through oppositely facing outlet apertures 142 and 144

As noted above the relationship between the surface areas of the conical surfaces 126 and 130 produced by their respective conical angles causes a certain amount of lift of the slidable valve element 114 to result from passage of fluid along underlying conical surface 130 and thus limits or decreases the net axial downward force along axis 116 exerted by the pressurized fluid on valve element 114. The reduction in this force reduces the friction between the bottom of the bottom shaft portion 120 and the bottom shaft engaging portion 172, which friction resists the clockwise rotation of the bottom shaft engagement portion, which clockwise rotation is produced by the lift of float assembly 186

Figure 3E:
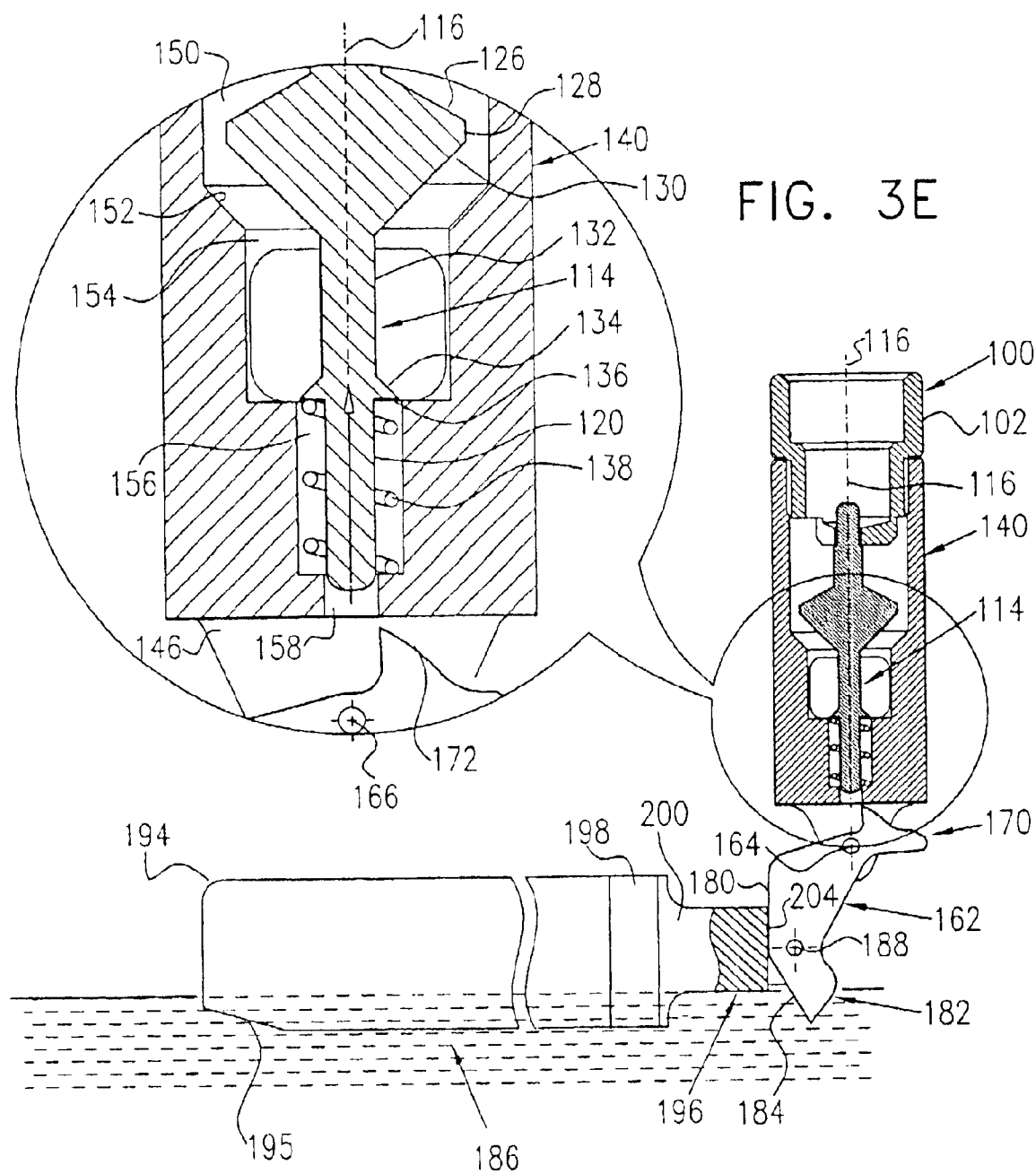

By reducing the frictional resistance to this rotation, the lift required from float assembly 186 is reduced and thus a relatively smaller float assembly 186 may be employed than would otherwise be required FIG. 3E shows the fill assembly once fluid flow therethrough has been terminated The slidable valve element 114 has been displaced upwardly along axis 116 in response to the action of compression spring 138, notwithstanding the fully raised orientation of the float assembly 186

Figure 4A:
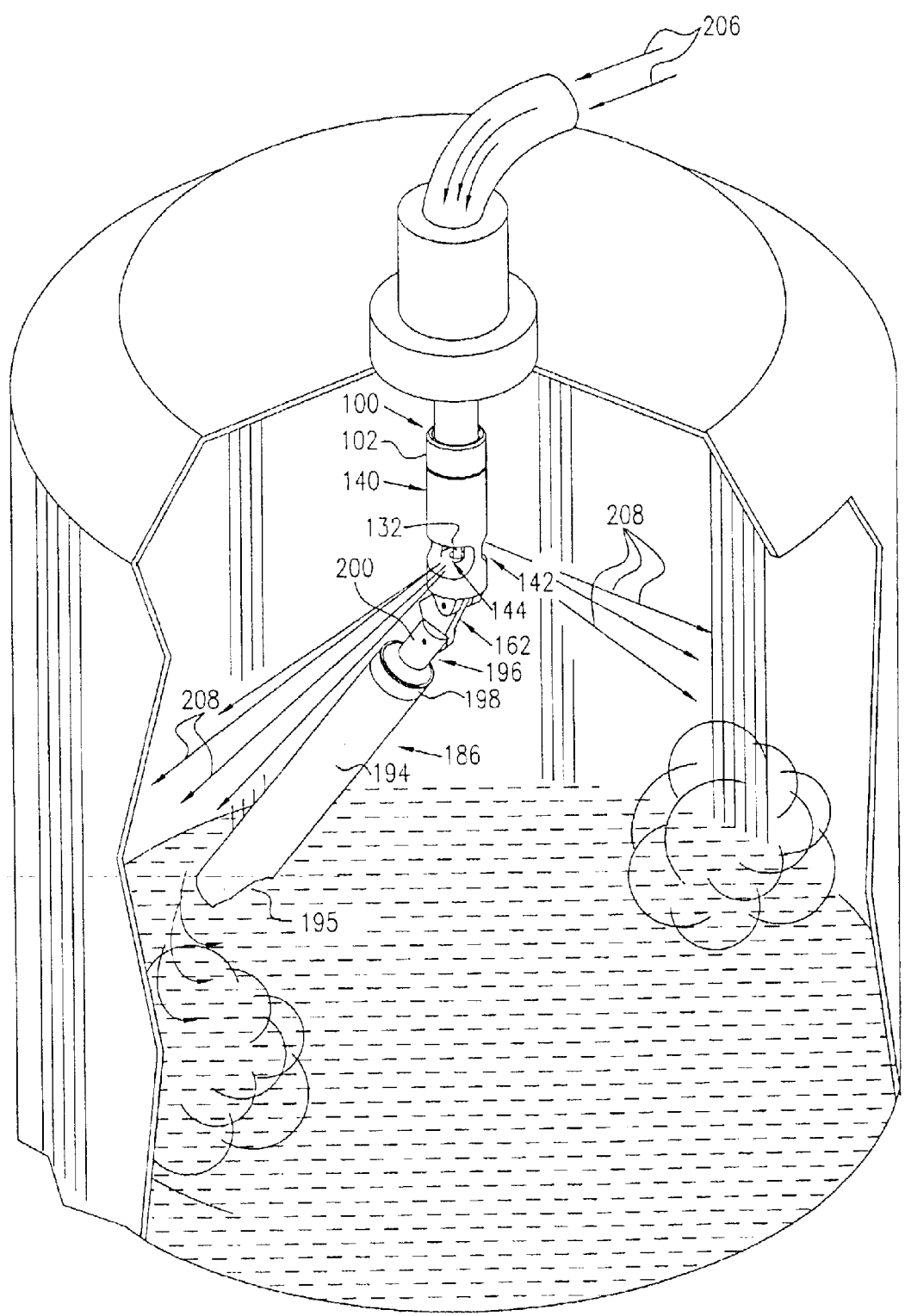
FIGS. 4A, 4B and 4C are simplified pictorial illustrations of the fill valve assembly of FIG. 1 in three different operative orientations during filling.
Figure 4B:
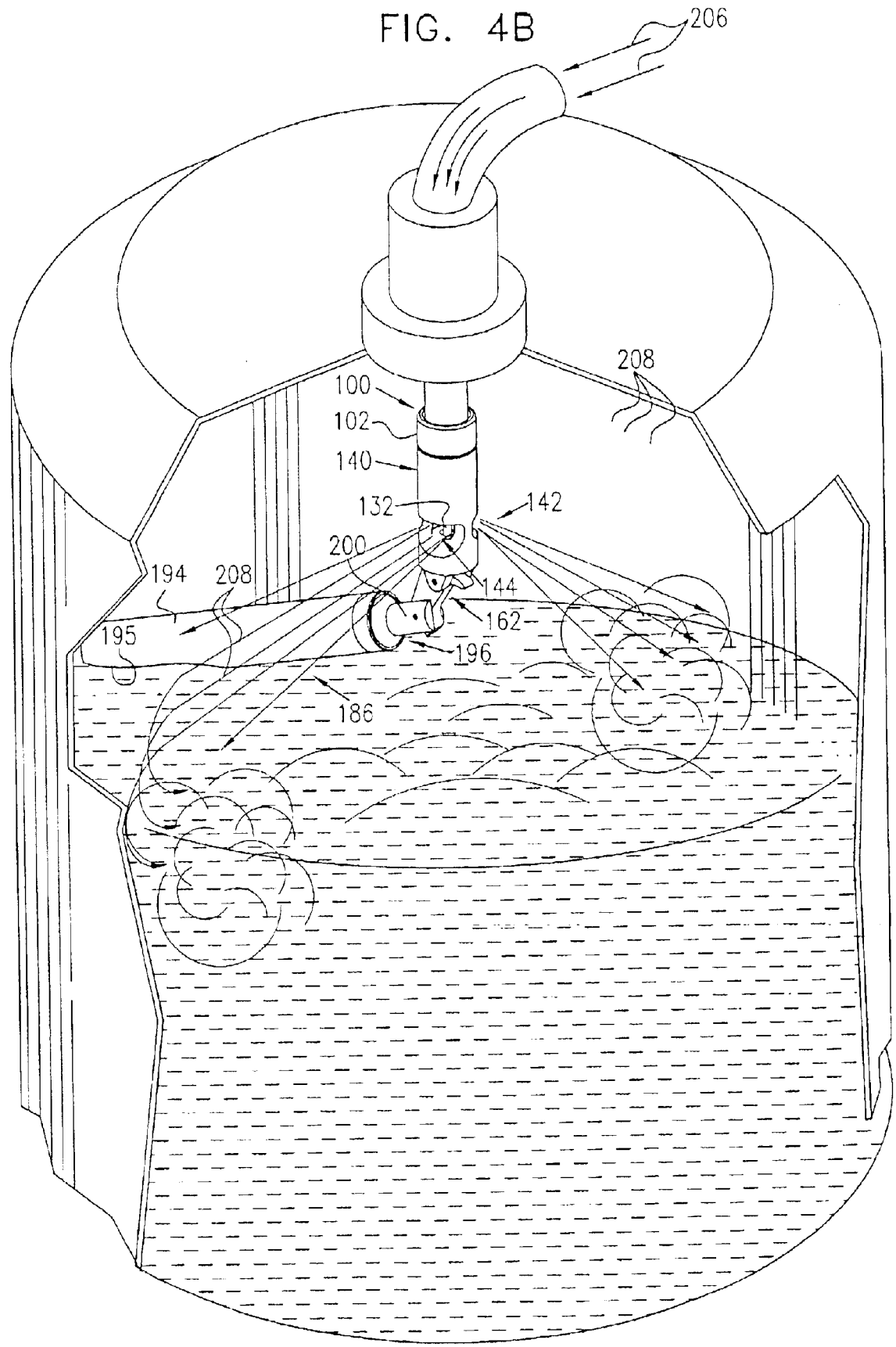
Figure 4C:
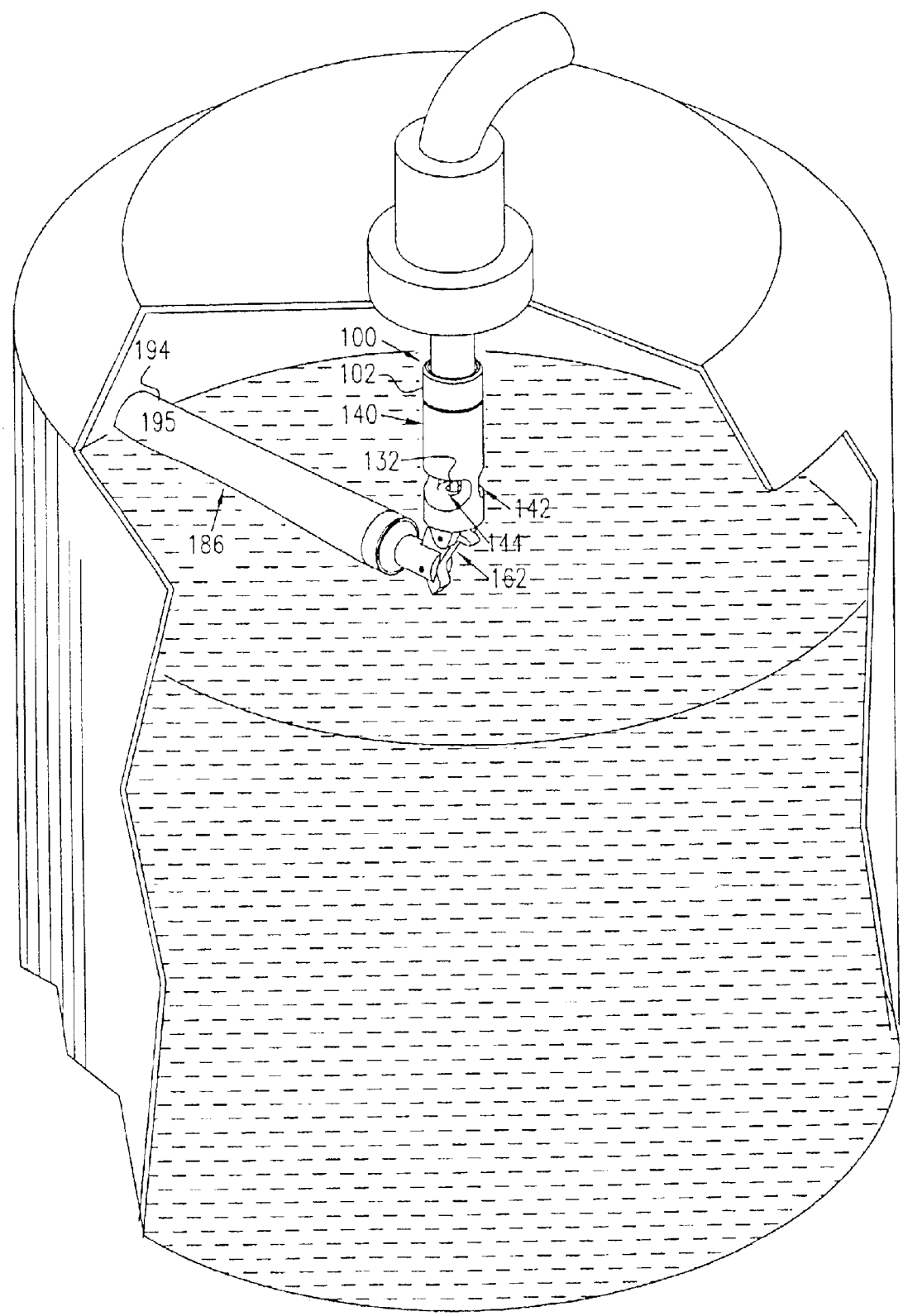
Figure 5A:
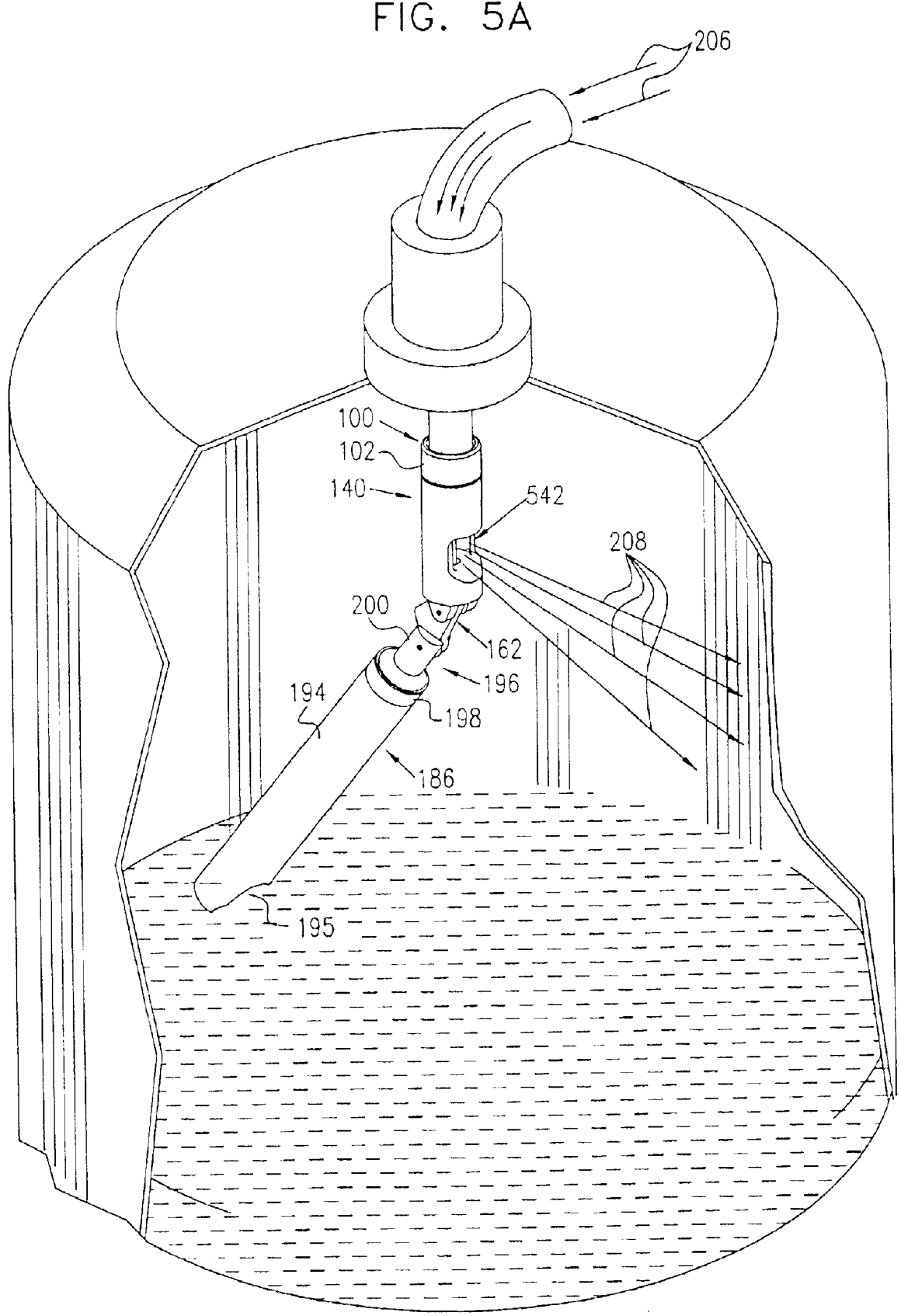
FIGS. 5A, 5B and 5C are simplified pictorial illustrations of a variation of the fill valve assembly of FIG. 1 in three different operative orientations during filling.
Figure 5B:
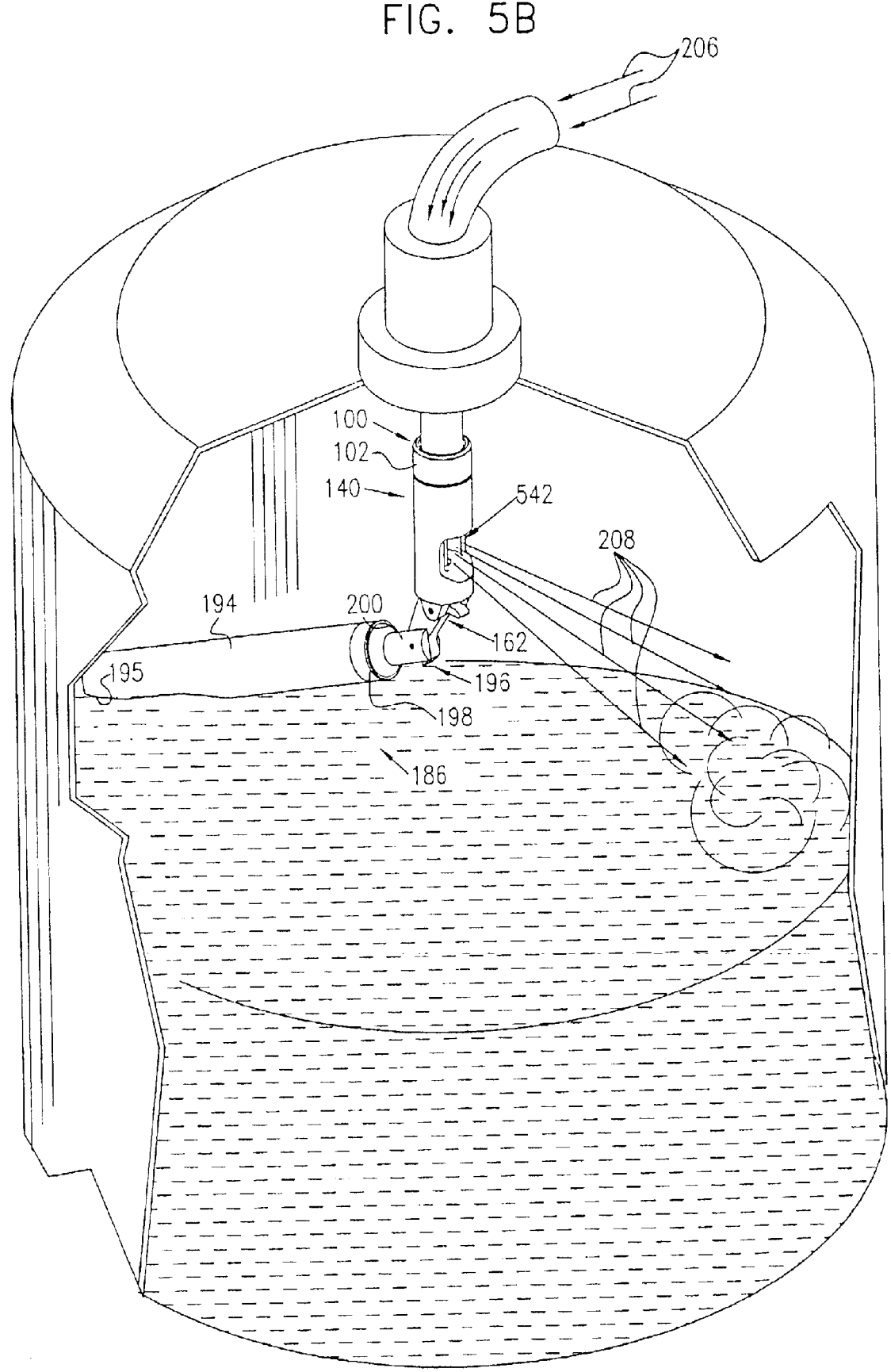
Figure 5C:
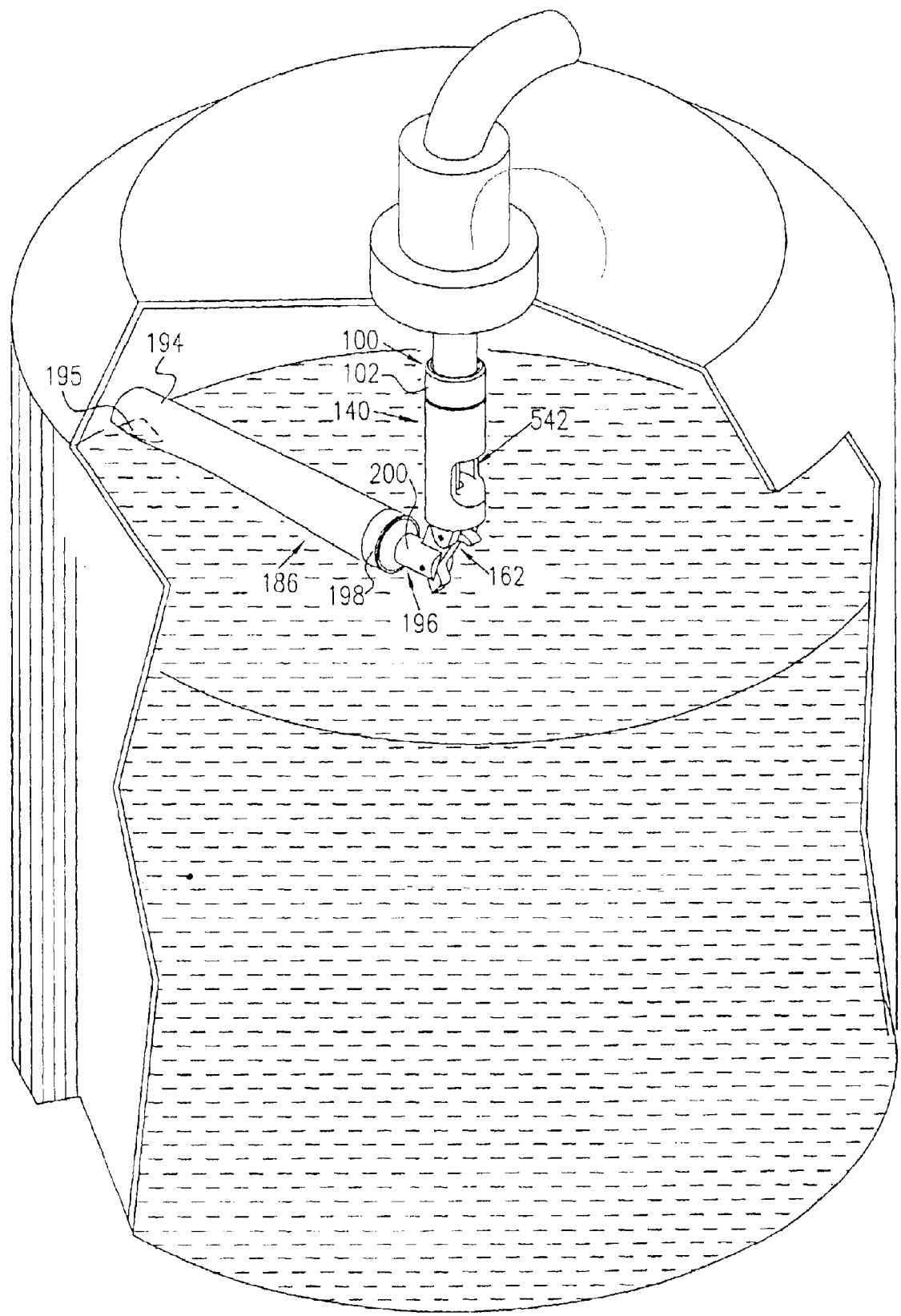
Figure 6E:
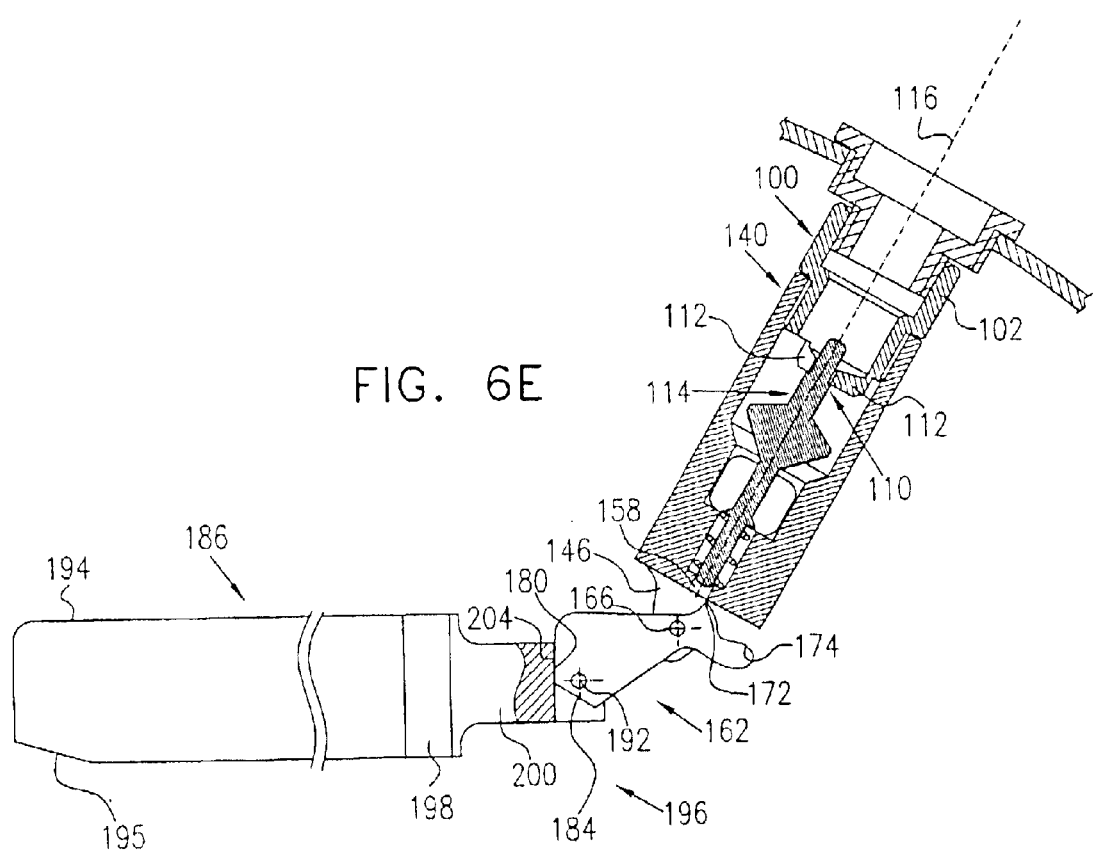

Reference is now made to FIGS. 4A, 4B and 4C, which are simplified pictorial illustrations of the fill valve assembly of FIG. 1 in three different operative orientations during filling, FIG. 4A corresponds generally to FIG. 2A, FIG. 4B corresponds generally to FIG. 2B and FIG. 4C corresponds generally to FIG. 2C It is seen in FIGS. 4A and 4B that a spray of fluid is provided generally sideways from apertures 142 and 144 when the float assembly 186 is in a fully or partially downward orientation As seen in FIG. 4C, when the float assembly 186 is in its fully raised orientation, the spray or fluid is terminated Reference is now made to FIGS. 5A, 5B and 5C, which are simplified pictorial illustrations of a variation in the fill valve assembly of FIG. 1 in three different operative orientations during filling. In this variation, which is not preferred, only one aperture 542 is provided and that aperture is located on valve body 140 at a location intermediate apertures 142 and 144 FIG. 5A corresponds generally to FIG. 2A, FIG. 5B corresponds generally to FIG. 2B and FIG. 5C corresponds generally to FIG. 2C It is seen in FIGS. 5A and 5B that a spray of fluid is provided generally sideways from aperture 542 when the float assembly 186 is in a fully or partially downward orientation As seen in FIG. 5C, when the float assembly 186 is in its fully raised orientation, the spray of fluid is terminated Reference is now made to FIGS. 6A, 6B, 6C, 6D and 6E, which are simplified pictorial illustrations of the fill valve assembly of FIG. 1 in five different operative orientations during filling at an angle and correspond generally to respective FIGS. 3A–3E. FIGS. 6A–6E illustrate the utility of guide 110, formed by guide fingers 112, and guide bore 158 in facilitating slidable movement of the axially slidable valve element 114 along axis 116 notwithstanding the fact that axis 116 is angled from the vertical, typically by up to 45 degrees It will be appreciated by persons skilled in the art that the present invention is not limited by what has been particularly shown and described hereinabove Rather the scope of the present invention includes both combinations and subcombinations of the various features described hereinabove as well as variations and modifications which would occur to persons skilled in the art upon reading the specification and which are not in the prior art.

What is claimed is:

1. A fill valve assembly comprising:
    a valve body extending along a longitudinal axis and defining a fluid inlet, a valve seat and at least one fluid outlet;

an axially slidable valve element arranged for axially slidable movement along said longitudinal axis, into and out of sealing engagement with said valve seat, said axially slidable valve element defining a first sloped surface sloping generally outward towards said valve body and having a first surface area, and a second sloped surface, sloping generally inward towards a center of the fill valve assembly and disposed downstream with respect to said first surface, said second surface having a second surface area greater than said first surface area; and a fill sensor, operatively associated with said valve element below a predetermined fill threshold, so as to prevent said axially slidable valve element from establishing sealing engagement with said valve seat;

said valve seat having a contact surface for contacting said second sloped surface;

wherein said first surface and said second surface are configured so as to allow, in an open position, a passage of a fluid past said surfaces, and wherein said valve body and said valve element are configured such that when said passage of said fluid is substantially at a maximum flow rate and a fluid level is below said predetermined fill threshold, a minor portion of said second surface area extends below a top of said contact surface of said valve seat, so as to produce a dynamic lifting force on said axially slidable valve element along said longitudinal axis to maintain said valve element in said open position until said predetermined fill threshold is attained.

2. A fill valve assembly according to claim 1 and wherein said at least one fluid outlet comprises a pair of oppositely directed fluid outlets arranged to direct fluid at an angle of preferably 45 degrees below the horizontal axis.

3. A fill valve assembly according to claim 1 and wherein said fill sensor comprises a float assembly operative within a predetermined range of float orientations relative to said longitudinal axis to prevent said axially slidable valve element from establishing sealing engagement with said valve seat.

4. A fill valve assembly according to claim 3 and wherein said float assembly includes a hollow float element having an opening arranged at a bottom, outwardly extending location thereon.

5. A fill valve assembly according to claim 1 and wherein said axially slidable valve element is arranged for axially slidable movement along said longitudinal axis, along first and second guides, into and out of sealing engagement with said valve seat.

6. A fill valve assembly according to claim 5 and wherein said first guide comprises a plurality of guide fingers disposed above said valve seat.

7. A fill valve assembly according to claim 5 and wherein said second guide comprises a guide bore defined by said valve body below said valve seat.

8. The fill valve assembly according to claim 1, wherein said valve body has an interior facing, and wherein said valve body and said valve element are further configured such that said interior facing slopes generally inward towards said center of the fall valve assembly at a height corresponding to a height of at least a portion of said second surface, when said passage of said fluid is substantially at said maximum flow rate.

9. The fill valve assembly according to claim 1, wherein said valve element is a normally biased-open, axially slidable valve element.

10. A fill valve assembly comprising:
a valve body extending along a longitudinal axis and defining a fluid inlet, a valve seat and at least one fluid outlet;

an axially slidable valve element arranged for axially slidable movement along said longitudinal axis, into and out of sealing engagement with said valve seat, said axially slidable valve element defining a first sloped surface sloping generally outward towards said valve body and having a first surface area, and a second sloped surface, sloping generally inward towards a center of the fill valve assembly and disposed downstream with respect to said first surface, said second surface having a lifting surface area disposed above said valve seat; and a fill sensor, operatively associated with said valve element below a predetermined fill threshold, so as to prevent said axially slidable valve element from establishing sealing engagement with said valve seat, wherein said first surface and said second surface are configured so as to allow, in an open position, a passage of a fluid past said surfaces, and wherein said valve body and said valve element are configured such that when said passage of said fluid is substantially at a maximum flow rate and a fluid level is below said predetermined fill threshold, said lifting surface area exceeds said first surface area, so as to produce a dynamic lifting force on said axially slidable valve element along said longitudinal axis to maintain said valve element in said open position until said predetermined fill threshold is attained.

11. The fill valve assembly according to claim 10, wherein said at least one fluid outlet comprises a pair of oppositely directed fluid outlets arranged to direct fluid at an angle of about 45 degrees below the horizontal axis.

12. The fill valve assembly according to claim 10, wherein said fill sensor comprises a float assembly operative within a predetermined range of float orientations relative to said longitudinal axis to prevent said axially slidable valve element from establishing sealing engagement with said valve seat.

13. The fill valve assembly according to claim 12, wherein said float assembly includes a hollow float element having an opening arranged at a bottom, outwardly extending location thereon.

14. The fill valve assembly according to claim 10, wherein said axially slidable valve element is arranged for axially slidable movement along said longitudinal axis, along first and second guides, into and out of sealing engagement with said valve seat.

15. The fill valve assembly according to claim 14, wherein said second guide comprises a guide bore defined by said valve body below said valve seat.

16. The fill valve assembly according to claim 10, wherein said valve body has an interior facing, and wherein said valve body and said valve element are further configured such that said interior facing slopes generally inward towards said center of the fill valve assembly at a height corresponding to a height of at least a portion of said second surface, when said passage of said fluid is substantially at said maximum flow rate.

17. The fill valve assembly according to claim 10, wherein said first guide comprises a plurality of guide fingers disposed above said valve seat.

18. The fill valve assembly according to claim 10, wherein said valve element is a normally biased-open, axially slidable valve element.

* * * * *